United States Patent [19]

Hermann, Jr.

[11] 4,086,060

[45] Apr. 25, 1978

[54] DISPOSABLE MANIPULATIVE LABORATORY DEVICE FOR TRANSFERRING BIOLOGICAL FLUIDS

[75] Inventor: William J. Hermann, Jr., Rockville, Md.

[73] Assignee: Jocelyn Dickson, Potomac, Md. ; a part interest

[21] Appl. No.: 734,950

[22] Filed: Oct. 22, 1976

[51] Int. Cl.[2] .................... B65D 83/14; G01N 1/00

[52] U.S. Cl. .................... 23/259; 222/394

[58] Field of Search .............. 23/259, 253 R; 222/394

[56] References Cited

U.S. PATENT DOCUMENTS

| | | | |
|---|---|---|---|
| 1,331,207 | 2/1920 | Mouneyrat | 23/253 R |
| 1,548,186 | 8/1925 | Claude | 222/394 X |
| 1,606,400 | 11/1926 | Cheney | 23/259 |
| 2,679,140 | 5/1954 | Burchett | 222/394 |
| 3,193,359 | 7/1965 | Baruch et al. | 23/259 |
| 3,522,011 | 7/1970 | Sanderson | 23/259 |
| 3,849,072 | 11/1974 | Ayres | 23/259 |

*Primary Examiner*—Robert M. Reese

*Attorney, Agent, or Firm*—David H. Semmes; Warren E. Olsen

[57] ABSTRACT

A manipulative laboratory device for transferring biological fluid from one or more primary containers to an associated secondary set of containers through a disposable closed compartment system. The compartment system allows for greatly simplified decanting procedures, for example, in pouring off serum samples in blood analyses. The transfer device is preferably of transparent plastic material, and allows for complete isolation among respective samples and selective transfer of controlled volumes of biological fluid when combined with a pump, through means to apply equal volumes of pressurized gas to each of the compartments. The transfer device allows, serum, for example, to be held and filtered during transfer, while maintaining the serum within a closed compartment to reduce the risk of hepatitis and similar infectious transmissions to operating personnel. In combinations with the disposable transfer device, a pressurization device and rack constructions are provided to facilitate gang handling of a plurality of biological fluid specimens, in one operation.

36 Claims, 12 Drawing Figures

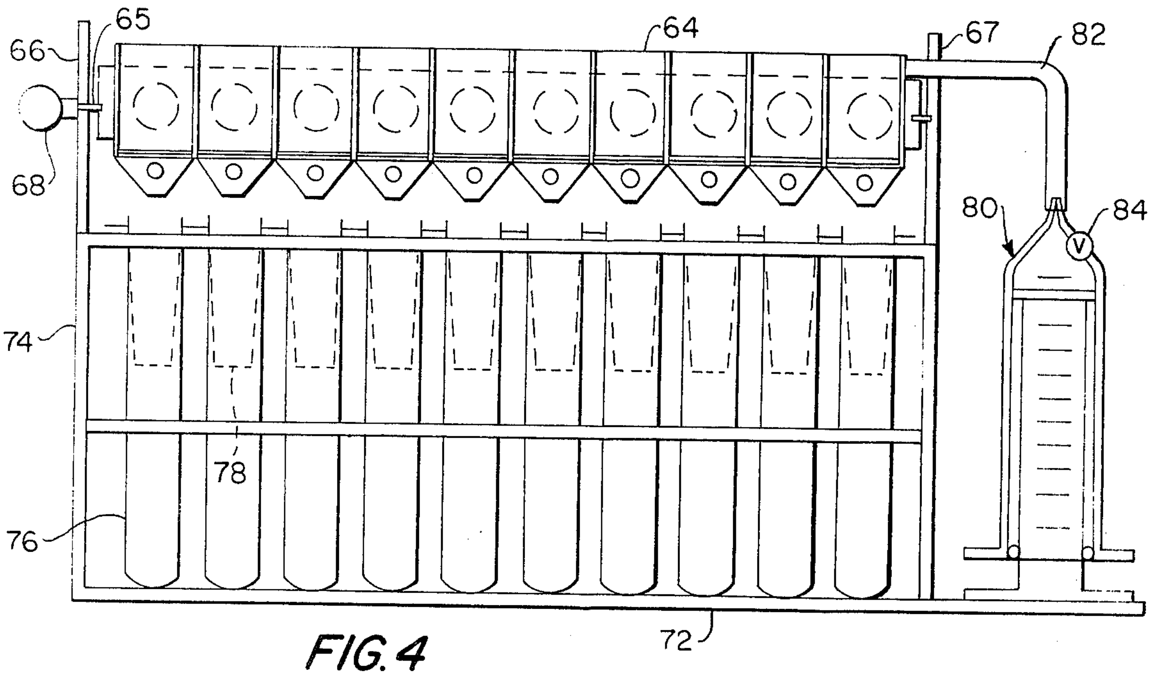
FIG. 4
FIG. 5
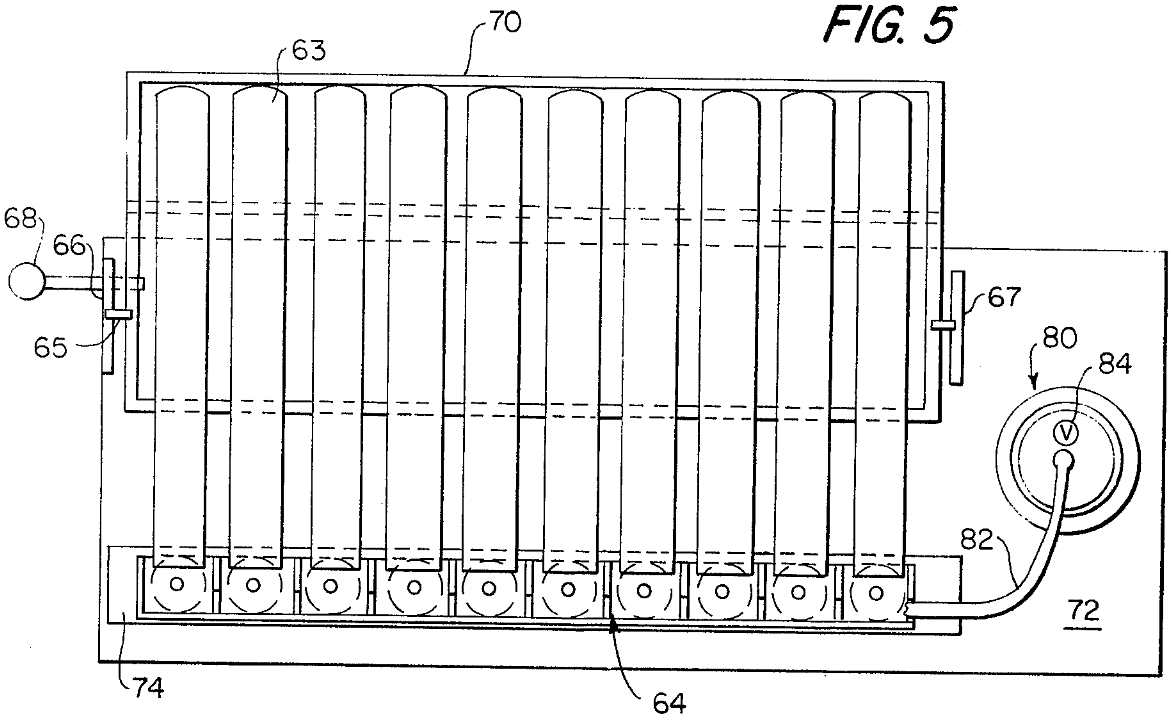

DISPOSABLE MANIPULATIVE LABORATORY DEVICE FOR TRANSFERRING BIOLOGICAL FLUIDS

BACKGROUND OF THE INVENTION (1) Field of the Invention

This invention relates to a disposable manipulative laboratory device for transferring biological fluids from at least one primary container to an associated secondary container. The invention is disclosed for general utility under laboratory conditions and is illustrated, in a preferred embodiment, for decanting serum, or plasma, from red cells in whole blood after they have been separated, as by centrifugation.

The invention further includes combinations which allow for gang transfer of a number of samples by one operator into a plurality of associated secondary containers, through rack constructions and an air pump which accurately transfers controlled volumes of biological fluid from each of a plurality of compartments in a disposable enclosure.

(2) Background of the Invention

The transfer of biological fluids under laboratory conditions is a necessary operation performed on a large scale in even relatively small laboratories. For example, when blood specimens are tested in clinical laboratories, it is frequently necessary to obtain a sample of the blood serum or plasma after the serum has been separated from the suspended cellular material. The serum or plasma which remains in the top portion of a blood collection-type tube after centrifugation must be quickly removed for further clinical testing. Usually, each blood collection tube is individually handled, in a laborious manual operation, with the concommitant danger that the serum will come in contact with the skin of laboratory personnel. This contact presents serious health risks to the laboratory personnel, among which the risk of hepatitis is perhaps the most serious. The present device allows for a transfer of biological fluids, such as separated blood serum or plasma, without exposing the serum to the air or the operating person as it is being transferred.

Among prior art devices concerned broadly with transfer of biological fluids, such as serum, from a primary container to a secondary container for analysis work, are the United States Patents, as follows:

NATELSON — U.S. Pat. No. 3,951,605
ATWOOD — U.S. Pat. No. 3,948,607
FORSSTROM — U.S. Pat. No. 3,945,412
LANIER — U.S. Pat. No. 3,938,958
BEALL — U.S. Pat. No. 3,907,505
LEMIEUX — U.S. Pat. No. 3,902,852
LeBLANC — U.S. Pat. No. 3,871,832
HAUG — U.S. Pat. No. 3,869,252
OHRINGER — U.S. Pat. No. 3,846,077
TOCCI — U.S. Pat. No. 3,833,341
JOHNSON — U.S. Pat. No. 3,826,621
SENDRA — U.S. Pat. No. 3,802,844
ZAUFT — U.S. Pat. No. 3,796,544
BLECHMAN — U.S. Pat. No. 3,751,990
HAMILTON — U.S. Pat. No. 3,582,285
NEJAME — U.S. Pat. No. 3,580,301
SEQUEIRA — U.S. Pat. No. 3,551,112
SANDERSON — U.S. Pat. No. 3,522,011
JONES — U.S. Pat. No. 3,511,613
BARUCH — U.S. Pat. No. 3,193,359
CLEVENGER — U.S. Pat. No. 2,644,743

CHENEY — U.S. Pat. No. 1,606,400
KELLER — U.S. Pat. No. 768,605

Significantly, the various and sundry apparatus taught by these prior art references do not include a disposable device which may be attached to the open upper end of a primary container which is then pivoted so that biological fluid may transfer through an outlet means which is operable to ensure that only a controlled volume of fluid will enter an associated secondary container.

The broad concept of a pivoting rack for decanting biological fluid is known, as shown by various of these references, e.g., the patents to Clevenger, Keller or Cheney. Unlike these racks which allow for a simple decanting operation of a gang of primary containers, the present invention is significantly characterized by a disposable manipulative transfer device that cooperates with at least one primary container to transfer fluid therefrom.

The patents to Lanier and Tocci illustrate pivoting devices for aligning a plurality of samples over a receiving plate. Lemieux uses a plurality of syringes capable of withdrawing small quantities of liquid and spotting them on a plate for microanalysis. In Tocci, a plurality of nozzles are held against a chromatographic plate that is heated in order to evaporate the solvent in deposited samples. As such, Lemieux and Tocci are directed to chromatography, per se, and not with large scale serum transfer.

The patents to Forsstrom, Blechman and Nejame illustrate rotating test tube racks, wherein a single module is indexed over various stations for a plurality of rotating tubes. As such, these patents illustrate indexing of test tubes under stationary nozzle means, and are not concerned particularly with an apparatus as disclosed herein wherein a simultaneous transfer of biological fluids may be accomplished from a plurality of primary containers to a plurality of secondary containers.

Various other forms of automated apparatus for transferring liquid from a source to a container are illustrated by these patents. The patents to Zauft and Haug employ electronically controlled nozzles which are positioned over a plurality of test tubes being conveyed past a dispensing station. Both of these patents illustrate completely automated testing devices, and not a disposable liquid laboratory device for transferring biological fluids from at least one primary container to an associated secondary container. The patents to Natelson, Sanderson and Baruch further illustrate entire analytical processes wherein a plurality of containers are transported along a conveyor device and past a stationary sample injection station. These patents also do not represent a disposable transfer device for biological fluids, but rather illustrate instruments which are capable of operating upon serum transfers after they have been assembled into a plurality of secondary containers. As such, these patents illustrate end uses for biological samples which have been previously transferred by the present invention.

The patents to Atwood and Johnson illustrate automated transfer systems wherein liquid is transferred from one container to another. The patent to Atwood employs hydraulically actuated pumps for drawing in slugs of samples from a probe device. The automated device of Johnson is specifically concerned with transferring liquids between containers, though his apparatus constitutes a hydraulic pumping system, and not a disposable manipulative laboratory device for transferring biological fluids as is presented herein. Clearly, none of the above-discussed patents disclose a simple manipulative device for decanting and transferring a series of biological fluids from primary containers, nor one both disposable and mountable directly upon the primary containers. The patents to Beall and Hamilton are cited merely to illustrate plastic receiving packages, wherein the packages themselves are indicated to be disposable. The patents to Sendra, Jones and LeBlanc illustrate various known forms of test tube holding devices, and are pertinent only insofar as they represent the practice in the art to support a plurality of test tubes in a holder. The patent to Ohringer illustrates a liquid sample collection tube which may be employed as the primary container according to the present invention. Ohringer further teaches a transfer tube for collecting serum alone, and this transfer tube may also be a primary container contemplated by teachings of the present invention. Finally, the patent to Lanier illustrates another disposable laboratory device containing one or more compressible tubes, which are filled by a peristaltic pumping action. As such, Lanier is merely only of interest and illustrative of the state of the prior art.

In summary, while the broad concept of a plurality of pivotable primary containers for decanting into a plurality of aligned secondary containers is known, none of these patents, individually or collectively, teach the specific structure of a disposable biological fluid transfer device which is characterized by being mounted proximate the pouring end of one or more primary containers, to define a closed transfer passage for fluids that are transferred at controlled rates and volumes past a valved outlet by a means for delivering an applied source of pressurized gas.

SUMMARY OF THE INVENTION

The present invention is a disposable manipulative laboratory device for transferring biological fluids from at least one primary container to an associated second container. The present invention defines a closed volume of biological fluid, which flows by gravity from a primary container, previous to a selective transfer into an associated secondary container. In laboratory blood analysis work, it is frequently necessary to obtain a cell-free sample of blood serum immediately after the serum has been segregated from the red cells, or erythrocytes. Such a segregation is commonly done by centrifugally driving the heavier cells to the bottom of a primary container which has been filled with the whole blood specimen. Upon such centrifugal separation, serum or plasma which remains in the top portion of the primary collection tube is then removed and clinically tested. One manner of removing the serum is that represented by the above-discussed United States patent to Ohringer, U.S. Pat. No. 3,846,077. Ohringer's transfer tube is pressed down within a blood collection tube so that the serum is forced inwardly into the serum transfer tube, through a bottom valve. According to the principles of the present invention, such a transfer tube may then be employed as a primary container for transferring the thusly collected biological fluid, i.e., blood serum, to a secondary container.

The present invention has a particular utility for use with a primary container of the serum-separation type. A Vacutainer brand serum separation tube is one manufactured by the Becton-Dickinson Company of Rutherford, N.J. The Vacutainer brand serum separation tube contains an integral serum separator, which forms a gel-type barrier between the particulates and the serum upon centrifugation. Hence, after the whole blood sample has been centrifuged, the serum may be completely decanted without danger that the cells will also be decanted.

Since the present invention has a particular utility for transferring such biological fluids as serum after it has been segregated from the cellular blood material, the use of such a type of serum separation tube allows the entire tube, after centrifugation, to be employed as the primary container according to the teachings of the present invention. In addition to the Vacutainer brand serum separation tube, another form of primary container usable with the present invention includes the SUR-SEP brand system made by General Diagnostics of Morris Plains, N.J. In this system a SUR-SEP unit is placed upon a standard collection tube before centrifugation, so that a silicon gel is drawn out and forced through the blood sample, to ultimately form a physical barrier between serum and the cells. Thereafter, the supernatant serum may be decanted leaving only the cellular material.

Hence, the present invention is a manipulative laboratory device which employs a primary container which can be any form of tube, including a blood collection tube which has been centrifuged with a serum/plasma separator to allow decanting of serum only. The present invention is also usable with a primary container such as the liquid sample transfer tube as illustrated by the patent to Ohringer. In any case, the present invention ensures that a biological fluid being decanted for the primary container is transferred through a closed volume form of enclosure, and transferred therefrom to an outlet which is controlled by a valve and a gas pressurization means. The disposable manipulative laboratory transfer device itself is an enclosure defining at least one compartment therein, and the enclosure further includes a first surface adapted to receive an open end of at least one primary container for a gravitational inlet flow communication between a primary container and a compartment. The gravitational flow communication is accomplished by mounting the first surface of the enclosure upon the tube when the tube is in an upright position. Thereafter, the tube and enclosure may be pivoted, as by a rack means, so that the biological fluid will then flow by gravitational influence towards the enclosure. From the enclosure, the fluid transfers to the secondary container via a particular form of air pressurization and outlet valving means.

According to the present invention, the enclosure includes a second surface that supports an outlet for selective biological fluid flow from at least one compartment within the enclosure to an associated secondary container, when the second surface is positioned proximate and above the open upper end of a secondary container. The second surface on the disposable enclosure may conveniently be planar and meet the first surface at substantially a right angle. Hence, when the primary container is pivoted 90° the second surface will go from a vertical orientation to a horizontal orientation over the secondary container. When so pivoted, the disposable manipulative laboratory device taught herein will not allow the biological fluid within a compartment to be transferred unless a selectively controlled volume of pressurized gas is applied to the fluid within that compartment. This is accomplished according to the present invention by gas pressurization means which is operable to transfer only a selective volume of biological fluid, that has flowed into a compartment from its associated primary container, into an associated secondary container when the second surface is positioned above and proximate the secondary container. A preferred pressurized gas supply device construction comprises a syringe-like pump. The disposable enclosure has means to equally divide the supplied air to a plurality of compartments within the enclosure, so that an exact dispensing of biological fluid will be accomplished upon a single actuation of the air pump. A further novelty to the present invention is the provision of a fluid valve means in the outlet between the enclosure and the secondary containers, with this valve means further comprising a funnel-like member that contains therein a buoyant ball which is operable to occlude the outlet of the funnel when all biological fluid within a given compartment has been transferred therefrom.

The present invention includes at least one compartment comprised by the enclosure, and preferably a plurality of compartments, such as ten, so that the laboratory operator will be able to efficiently transfer equal volumes of serum, for example, from each enclosure into each secondary container. It should be emphasized that a significant feature of the present invention is the ability to maintain the biological fluids isolated within the primary container/transfer enclosure combination. Hence, without danger that the fluids will contact the ambient air of the laboratory, or the skin of the laboratory operator. This is a significant feature and object of the present invention because risks of communicable disease, particularly the risk of hepatitis, are ever present when a laboratory operator simply decants a primary container containing blood serum into a secondary container. With the present invention, decanting or transfer operations may be accomplished safely, efficiently and inexpensively for a large number of fluid samples.

For a further synergistic combination with the disposable laboratory transfer device, a pivoting rack assembly is provided for a plurality of primary containers, together with a plurality of stations for positioning the associated secondary containers which receive the transferred fluid. According to a preferred embodiment, a plurality of compartments are linearly spaced with respect to first and second surfaces of the enclosure, so that a gang of primary containers can be simultaneously pivoted prior to a subsequent transfer of biological fluids.

A further advantage of the present invention, realizable when a plurality of enclosures are provided in the disposable transfer device, is the use of a plurality of secondary containers that are connected by bridges. Since employment of the present manipulative laboratory transfer device with a pivoting rack allows for an exact registration of the outlet nozzles on the respective enclosures over a plurality of secondary containers, the secondary containers may be connected by a thin web of plastic material for quick alignment with the associated outlets on the transfer device. A further feature of the present invention includes using a plurality of secondary containers wherein each secondary container comprises a cup having an upwardly extending lip at least partially about its open upper end. These lips will cooperate with the outlet means on the enclosure, as it is positioned proximate and above the open end of the secondary containers. Hence, transfer of biological fluid from an enclosure, into a secondary container, is accomplished with minimal danger of spillage or contamination to the operating person.

As will become more apparent hereinafter, this invention comprises a disposable manipulative laboratory transfer device, and also a disposable device in combination with permanent structures to allow gang pouring of a plurality of primary containers into a particularly advantageous form of secondary container. Further objects, advantages and features of the present invention will become apparent by reference to the following detailed description, wherein reference is made to the accompanying drawings.

BRIEF DESCRIPTION OF THE DRAWINGS

FIG. 4 illustrates a front view of a third embodiment, wherein ten compartments are provided for a disposable manipulative laboratory device in combination with a transfer rack assembly and air pump;

FIG. 5 is a top view of the embodiment of FIG. 4;

DESCRIPTION OF THE PREFERRED EMBODIMENTS

Figure 1:
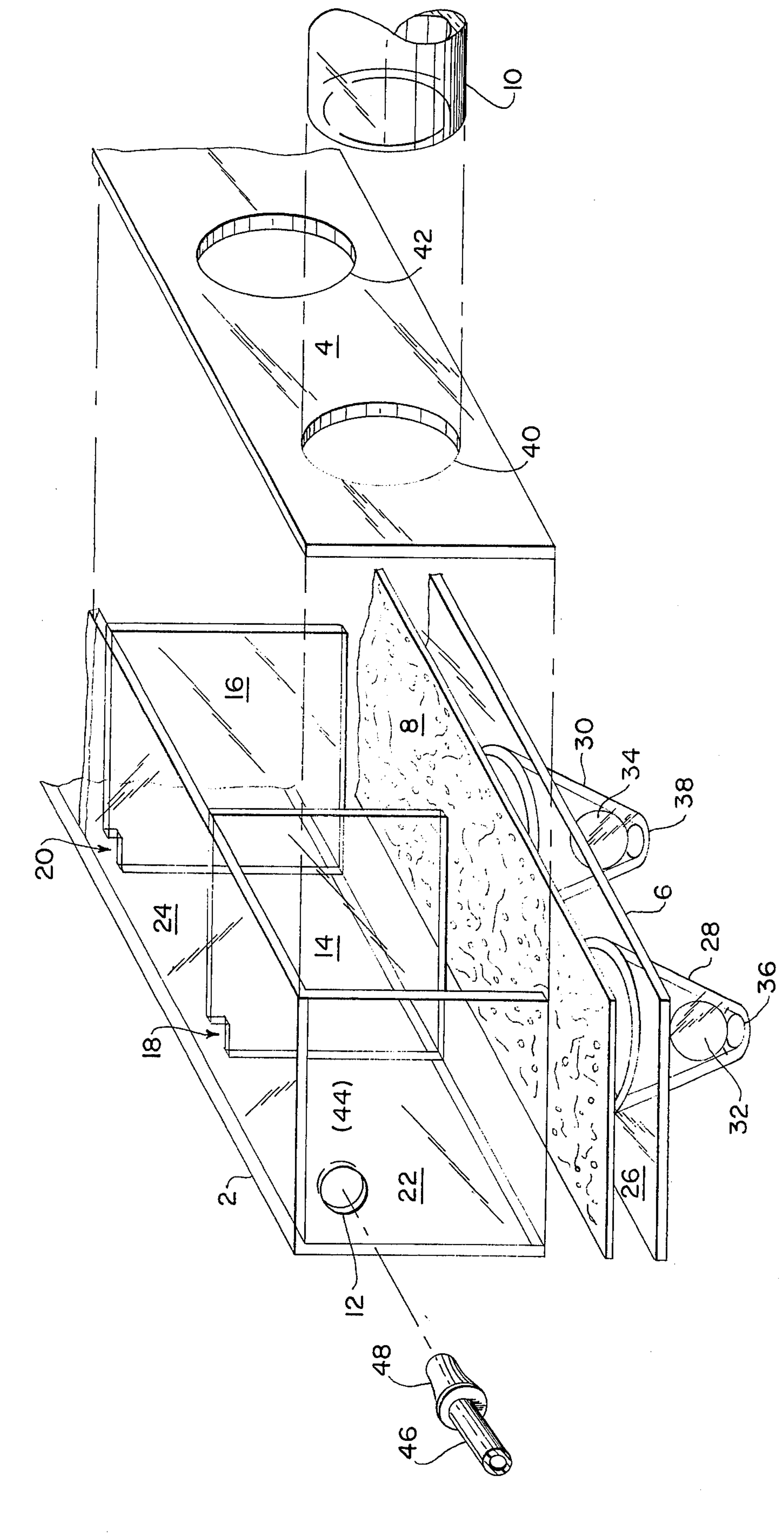
FIG. 1 illustrates in explosion view a preferred embodiment of a manipulative laboratory device for transferring biological fluid, according to the teaching of the present invention.

FIG. 1 shows, in explosion view, one preferred embodiment of a disposable manipulative laboratory device according to the principles of the present invention. It materially includes an enclosure which may be cube-like, as illustrated in FIG. 1. Such a cube-like form may be economically defined by an assembly of parts. In FIG. 1 a main frame for the transfer device is shown at 2. This main frame includes a front wall 44, a top wall 24, and a plurality of compartments separated by septum-like members 14, and 16. In this embodiment, the compartments are linearly spaced with respect to the top and front walls, for a purpose which will be hereinafter become more evident. The enclosure is further defined by a first surface 4, and a second surface, 26. An end or side wall 22 cooperates with septum-like member 14 to comprise at least one compartment within a long enclosure. The second surface 26 is illustrated to be a substantially planar surface which intersects the first surface 4 at substantially a right angle, upon ultimate assembly. The preferred embodiment of FIG. 1 thereby conveniently defines an enclosure, through the intersection of planar surfaces, though any other form of arcuate or semi-arcuate surfaces may be employed according to the teachings of the present invention. The first surface 4 is adapted to receive the open end of at least one primary container 10, so that in the orientation shown in FIG. 1 there will be a gravitational inlet flow communication between the primary container 10 and the compartment located within the end wall 22 and the first septum 14. The first surface, 4, is preferably a semi-rigid or pliable plastic-like material, which is provided with a distensible inlet orifice 40. The inlet orifice 40 may be defined by the same plastic which comprises first surface 4. Inlet 40 is of a diameter smaller than the outer diameter of the open end of the blood draw-type of collection tube, as shown at 10. In like fashion, a similarly configured inlet orifice 42 may be provided in spaced linear relationship to the first inlet orifice 40, so that a plurality of discrete biological fluid transfers may be obtained for one manipulation. The end wall 22 in FIG. 1 further includes a gas pressurization inlet orifice 12, which is adapted to receive a gas pressurization line 46 through the provision of a gasket type connection, as schematically illustrated at 48. The gas pressurization supplied through line 46 is enabled to equally pressurize a plurality of linearly extending compartments by the structural provision of a first gas communication orifice 18, for example, in the first septum-like wall member 14. In like fashion, the second linearly disposed compartment includes a second septum-like wall 16, having a similar gas communication orifice 20 disposed proximate the surfaces 44 and 24. The main frame 2, as well as the second surface 26, are preferably constructed of a transparent rigid plastic material which may be molded in separate components, as illustrated in FIG. 1, or alternatively molded in a single piece comstruction. The plastic material used to form the enclosure may be of any known type, such as PVC, polyethylene, or polypropylene, for example. Similar optically transparent plastic materials may be used for constructing the first surface 4, since they are generally somewhat resilient and will allow distension of the inlet orifices 40 upon insertion of a blood collection tube, such as shown at 10. Additional usable plastic materials include polystyrene, cellulose propionate, as well as fluorocarbon-type plastic materials. While it is preferred that the enclosure itself be comprised of transparent materials, for visual confirmation of the transfer operation, selected portions of the enclosure may alternatively be made of non-transparent forms of such plastics, without departing from the teachings of the present invention.

In the embodiment of FIG. 1 the disposable manipulative laboratory device illustrated may also include a filter medium, such as the filter paper illustrated at 8. The filter paper may be of any material sufficiently porous to act as a coarse filter for particulate manner remaining in the fluid that has flowed gravitationally from the primary container 10 when it is pivoted horizontally as in FIG. 1. The length of filter paper 8 may be continuous, as illustrated in FIG. 1, and the bottom portion of each septum may be bonded by a resin to the top surface of second surface 26. Each bond, therefore, also act as an impervious liquid seal through the filter. Alternatively, the filter paper 8 may be omitted or segmented within each compartment.

Second surface 26 of assembly 6 in FIG. 1 includes a funnel-like outlet means which is particularly adapted for a selective outlet flow communication from each compartment to an associated secondary container when the second surface 26 is positioned proximate and above the open end of such a secondary container. For this purpose, the funnel-like member 28 is shown to include a buoyant ball member 32 which is operable to function as an occluding valve over the outlet orifice 36. The buoyant occluding ball 32 is constrained for movement within the funnel 28, by means such as the interposition of the filter element 8. Alternatively, the filter 8 may be deleted and an appropriate bridge structure placed upon the second surface 26, proximate the entrance to the funnel 28, so that the ball will be constrained to remain within the funnel 28. Therefore, the outlet means 28 further includes a fluid valve means which is operable to close off outlet flow communication from its associated compartment when all biological fluid within a compartment has been transferred. Fluid transfer is not solely dependent upon the orientation of the disposable device vis-a-vis the secondary container, i.e., as shown in FIG. 1, but rather the orifice 36 is dimensioned so that a biological fluid, such as blood serum, will not flow through the outlet orifice unless there is a pressurization upon the fluid within each compartment, as by the gas pressurization line 46. When a biological fluid such as blood serum is to be transferred, the blood serum is viscous enough to form a meniscus at the outlet 36 in the absence of a superposed pressure on the volume of serum contained within each compartment. Hence, an advantage of the present disposable manipulative laboratory is the ability to selectively transfer specific volumes of serum from one or more compartments by the parallel and simultaneous application of a gas pressure to each compartment.

Figure 2:
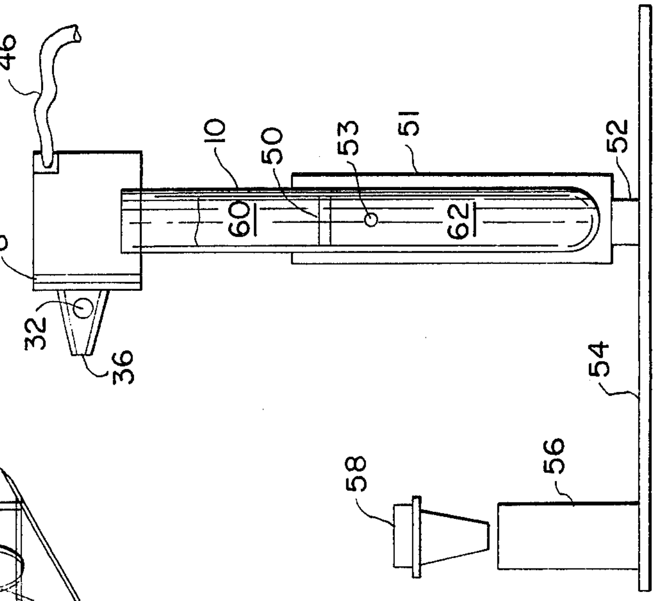
FIG. 2 illustrates a larger combination as a second embodiment of the present invention, including a pivoting primary container rack and a secondary receiving container mounting.

FIG. 2 illustrates a larger and second embodiment of the present invention, wherein the disposable transfer device is combined with a particular form of container and rack structure. The blood collection tube 10 is held in a pivoting rack 51, by a vertical support member 52. The primary rack 51 pivots around axis 53 so that the second surface of the transfer device may be positioned above and proximate the open upper end of a secondary container such as shown at 58. The secondary container 58 is advantageously maintained in a fixed orientation to the primary pivoting rack 51 by a support 56, with both the primary and secondary container supports mounted upon a base plate 54. As shown in FIG. 2, the occluding ball 32 will be constrained within the outlet funnel arrangement when the device is first attached to a primary container 10, in the orientation of FIG. 2. While any form of pressurized gas supply may be used to transfer controlled volumes of biological fluid according to the invention, in a preferred embodiment a separate gas pressurization line 46 may be releasably connected to the disposable transfer device after or simultaneously with the insertion of the primary container 10 within the first surface of the transfer device.

As illustrated in FIG. 2, the blood collection tube is of the separation type, wherein the serum or plasma 60 has been segregated from the red cells or erythrocytes by a serum separation barrier 50. While a serum separation is illustrated in FIG. 2, at 50, it is clear that the transfer device is equally applicable to transferring a monolithic biological fluid within a primary container, such as that illustrated at 10. However, with the prevalence of serum separation techniques in this art, one advantageous feature of the present invention is the ability to directly apply the transfer device of the present invention upon a blood collection tube which has been first treated and centrifuged so that the serum component is a distinct supernatent, as shown in FIG. 2.

Figure 3:
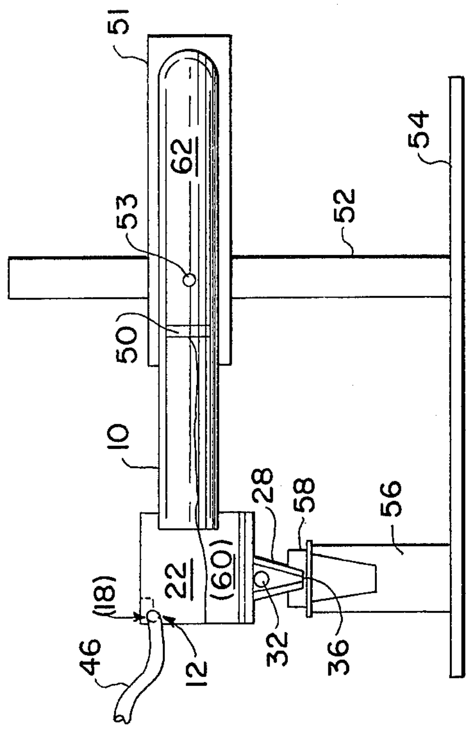
FIG. 3 illustrates a second position of the embodiment of FIG. 2.

In FIG. 3 the pivoting rack 51 is shown in a horizontal position, with the second surface of the transfer device positioned proximate and above the open upper end of a secondary container 58. It should be appreciated that the serum 60 will then freely flow, by gravity, into the lowermost portion of the combined volume defined by the compartment and the portion of the test tube above the serum separation element 50. The serum 60 will, of course, seek its own level within the combined volume, so that the buoyant ball 32 will move relatively away from the outlet orifice 36. However, absent an application of gas pressure, for example, through the line 46, there will be no increase in the ambient pressure exerted upon the upper surface of the serum 60. Absent a driving force on the upper surface of the viscous serum 60, the meniscus formed at the outlet orifice 36 will prevent discharge. It should also be noted that while the outlet 28 is shown to be substantially funnel-like, this is merely illustrative and any other geometry, such as a right circular cylinder, may be employed, provided the orifice 36 is occluded by contact with some surface of the buoyant ball 32. It should also be appreciated that when the transfer device includes a plurality of compartments, such as ten, a gas communication orifice within each septum wall member will allow equal pressurization of the segregated serum within each compartment. Equal volumes of fluid will be transferred through the respective outlets by such a parallel pressurization. If different volumes of serum are in each compartment, transfer of all serum within one compartment will result in the buoyant ball settling to occlude the outlet. Hence, the pressurizing gas will not escape through the outlet orifice of any exhausted compartments. This is particularly advantageous if a plurality of compartments are employed. An operator may gang transfer individual aliquots of serum without fear that the emptying of an individual compartment will effect the continued transfer of equal fluid volumes from each of the remaining compartments.

The third embodiment of FIGS. 4 and 5 is a disposable transfer device for ten containers, in combination with an air pump to supply the gas pressurization equally sent to each compartment. FIGS. 4 and 5 also illustrate that a larger combination of the invention includes a pivoting primary container transfer rack for cooperation with an associated number of secondary containers supported by a fixed rack. In this embodiment, the two views illustrate that the primary container rack 70 is supported for pivotal arrangement about an axis 65. The pivoting rack 70 may be maintained in a horizontal position, as shown in FIG. 4, in front view, by a latch mechanism 68 which will support the frame 70 in a relatively horizontal position with respect to the vertical rack supports 67. The disposable manipulative laboratory transfer device 64 is illustrated with ten compartments, with the end wall of a first compartment connected, by an air pressurization line 82, to a particular form of air pump 80. The air pump 80 is of the syringe or air pump type, which includes a piston slideable within an outer cylinder. As shown, the outer cylinder has a proximate end open for receiving the piston, and a closed distal end connected to gas pressurization line 82. The distal end includes a check valve 84 adapted to allow ambient air to enter into the cylinder when the outer cylinder is raised, relative to the piston, and prevent air compressed within the outer cylinder from escaping to ambient when the outer cylinder is moving downwardly with respect to the piston. Such check valves are quite conventional, and the operating differential for check valve 84 is chosen so that ambient air enters only when a vacuum is formed, as by raising the outer cylinder with respect to the piston. If the outer cylinder is left at a fixed position relative to the piston, a trapped volume of air is maintained within the individual compartments, the pressurization line 82, and the space above the piston within pump 80.

FIG. 5 represents a top view of the embodiment of FIG. 4, and illustrates that the plurality of compartments are linear with respect to both of the first and second surfaces defining the overall enclosure. In FIGS. 4 and 5, the entire assembly is illustrated to be mounted upon a base plate 72, in order to maintain the relative positions of the pivoting rack 70 and the fixed rack 6. In FIG. 4 two alternate forms of secondary containers are illustrated. A conventional test tube may be positioned, as shown at 76, or a plurality of bridged cups, one being numbered 78, may be employed to act as a unitary group of secondary or receiving containers.

It should be noted that the bridged secondary receiving cups 78 may be conveniently employed for further analytical processing of a biological fluid, such as serum, after a transfer by the present invention. The bridged secondary cups may conveniently be spaced on centers to allow quick placement into a group of samples into automated analysis machines. Alternatively, the bridges between the respective cups 78 may be slightly flexible, so that they may be bent into an arcuate progression and accommodated by those machines which are designed to process samples which are presented in a curved progression. The secondary rack 74 may also be movable with respect to the base plate 72, so that a train of secondary containers may be indexed under the plurality of compartments 64, with, for example, ten aliquots of serum being transferred into ten secondary receiving cups at a time.

Figure 6:
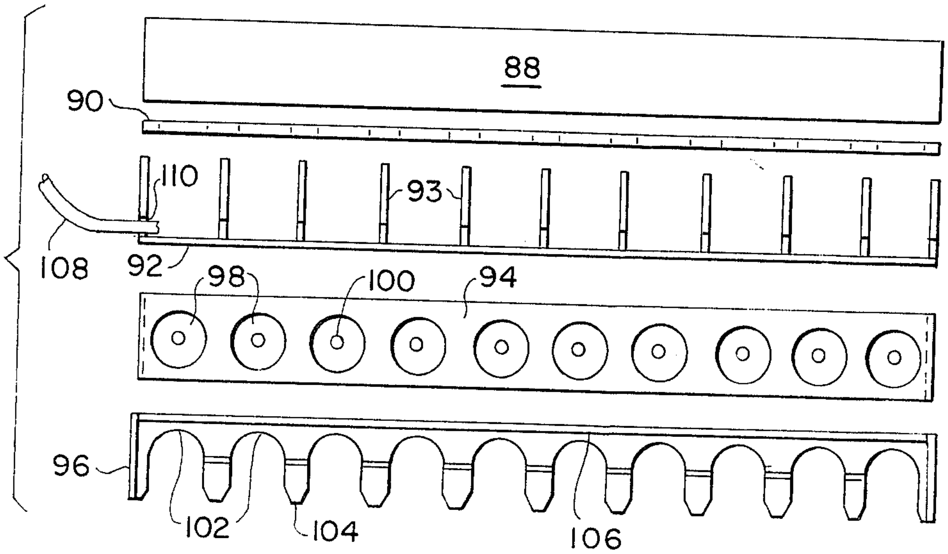
FIG. 6 illustrates a top explosion view of a fourth preferred embodiment according to the present invention, wherein a secondary rack is incorporated into the disposable transfer device.
Figure 7:
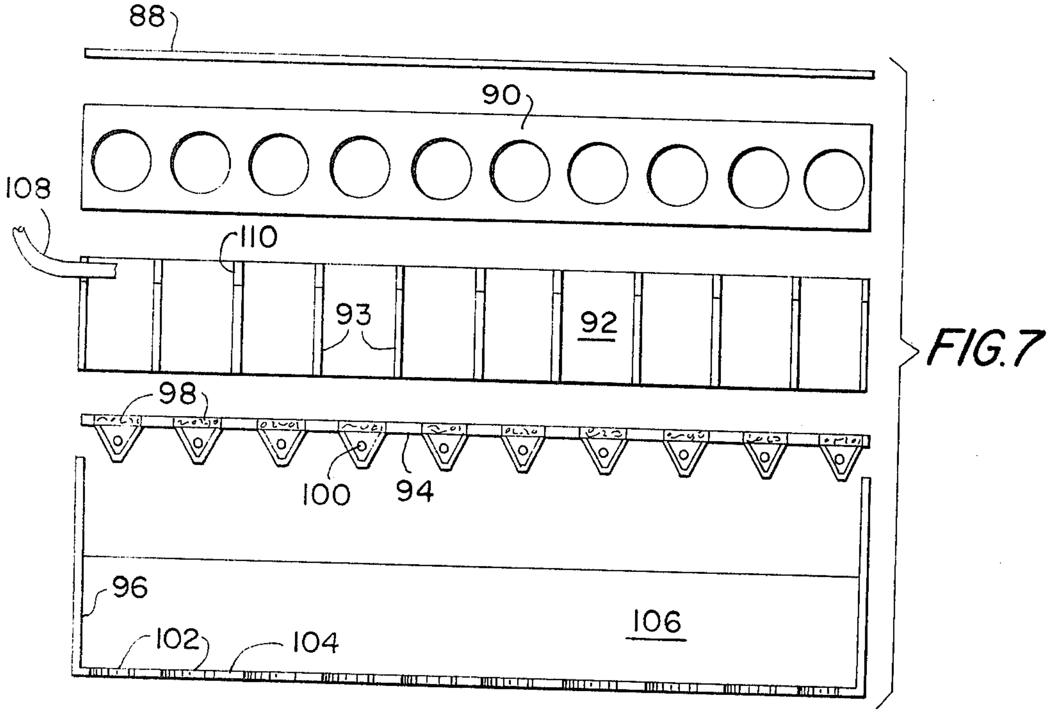
FIG. 7 is a front explosion view showing the embodiment of FIG. 6.
Figure 8:
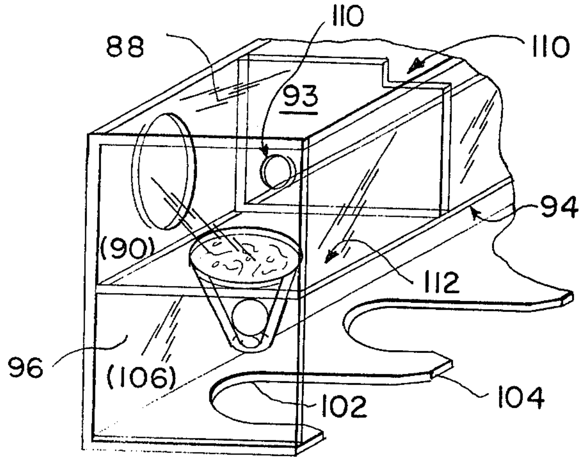
FIG. 8 is a perspective view showing an assembly according to the embodiment of FIGS. 6 and 7.

FIG. 6 illustrates, in top explosion view, a fourth embodiment of disposable manipulative laboratory transfer device according to the present invention. FIG. 7 illustrates this same embodiment in front explosion view, and a perspective representation of a final assembly for this embodiment is shown in FIG. 8. This fourth embodiment of a disposable transfer device significantly includes an integral rack for supporting a plurality of secondary containers upon the disposable transfer device itself. The second embodiment may be assembled with a first surface 90, a second surface 94, a third surface 92, and a fourth surface 88, in analogous fashion to the embodiment of FIG. 1. The walls may be transparent plastic, as in the embodiment of FIG. 1. The first surface 90 preferably includes distensible inlet openings for engaging the outer surface of a primary container, and as shown may be a separate element which is combined in the total construction. The second surface 94 is illustrated in FIG. 7 to have filter elements 98 positioned directly over each inlet to the funnel-like outlets. The filter element 98 may be of a material such as nylon fiber, and easily placed to act both as a filter and a constrainment for the buoyant ball 100 which functions as previously described. Each septum between the ten compartments illustrated in this embodiment for a disposable transfer device may include any form of gas pressurization header means, such as the orifices 100 which are positioned proximate the fourth surface 88 and the third surface 92. Any other form of header arrangement may be provided, the only requirement being that a gas pressurization, as from externally connected pressurization line 108, be equally applied to each of the compartments defined between the outer surfaces of the enclosure and the individual septum-like wall members 93. It should be noted that the volume within each compartment need not necessarily be greater than the volume of the associated primary container which is to be inserted through the inlet orifices in the first surface 90. Rather, the volumetric dimension of each compartment is determined only by the consideration that the biological fluid which will flow by gravity from the horizontally positioned primary container should not fill the individual compartment to a level which will come near the gas transfer passage 110. Of course, if the header is external to the enclosure itself, for example, along the top of fourth surface 88, the usable volume within each compartment will be essentially optimized since upward fluid flow into the header is precluded in the horizontal position, as illustrated in FIG. 8.

One form of primary container that is usable with any of the embodiments taught herein are blood collection-type tubes which conventionally range from 3 ml to 20 ml. Since most of the tubes have diameters at their open ends of between 10–13 mm, stepping in increments of 1 mm, a fairly large number of tubes may be accommodated by a given inlet opening on the first surface of the transfer device. To further illustrate use of this device in blood serum analysis, it is known that a normal hematacrit for human blood is approximately 40%, i.e., the red cells, or erythrocytes, comprise approximately 40% by volume of the whole blood. A very low hematacrit would be 20%. Therefore, a 10ml blood collection tube as a primary container would contain no more than 8 ml of serum, and 2 ml of red cell matter. The present invention is particularly useful with serum separation tubes that provide for a gel-like separation between serum and cells, after centrifugation. The volume of each individual compartment is sized so that the serum to be decanted from the open end of the blood collection tube will not fill the compartment to the point of approaching the gas passages between compartments. Of course, with the above-disclosed alternate gas pressurization header designs, an effective baffling may be provided around the gas communication between the compartments so that no possibility of mixing between the fluids in each compartments exists.

An integral secondary container supporting rack, as shown in FIGS. 6–8, may comprise a unitary plastic element 96 which includes curved holder outerlines 102 cut out from the secondary container supporting surface 104. Additionally, there may be provided a backing plate 106 for rigidity, so that a number of sample cups, for example the bridged variety above-discussed, may be slipped into the curved outlines 102 from the right side, as in FIG. 8. With cups of the bridged variety, the web bridging individual cups may rest upon the rack surface 104, so that the openings of each of the individual cups will be substantially coplanar with the surface 104. As further shown in FIG. 8, a filter paper 112 may alternatively be placed on second surface 94, in the same manner as the filter paper is disposed in the embodiment of FIG. 1.

Figure 9:
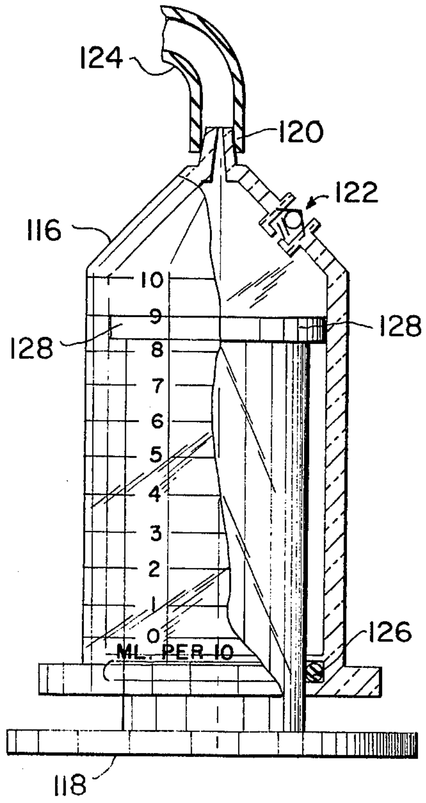
FIG. 9 is a front view of a preferred embodiment for a gas pressurization means operable for use within the teachings of the present invention.

FIG. 9 illustrates a preferred embodiment of air pump to act as the supply for the gas pressurization means taught in the present invention. The air pump may be of the syringe-type, wherein a piston 128 is slideable with an outer cylinder 116, with the outer cylinder having an open proximate end at 126 that includes an O-ring for a slideable air-tight seal. The air pump of FIG. 9 further includes a check valve 122 proximate the distal end of the outer cylinder 116, in the vicinity of the air pressurization line 124 which may conveniently fit over an air outlet orifice 120 on the pump. The outer cylinder 116 may conveniently be of a transparent plastic material, and include graduations for calibrating the volume of air which is to be displaced into the plurality of compartments in the disposable laboratory transfer device. In the position shown in FIG. 9, the pump is operated by raising the outer cylinder 116 so that the top of the piston is coincident with the 0 reference on the outer surface of the cylinder 116. In so raising the outer cover 116, there will be a vacuum created within the space above the piston 128, so that the check valve 122 will admit ambient air into the space defined above the piston. The graduations upon the outer cylinder 116 may be conveniently caibrated for a transfer device having a given number of compartments. The graduations may be referenced to the number of millimeters of biological fluid which will be transferred from each of ten compartments, for example, as in the enclosure of FIGS. 3 and 4. When the outer cylinder 116 has been raised so that the 0 graduation is coincident with the top of the piston surface 126, a movement of the outer cylinder downward, for example, to the graduation labeled "2", will ensure that a two millimeter volume of air will be introduced in each of the ten compartments. Since the pressurization line 124 supplies each compartment in parallel, the total air volume displaced between the graduations "0"and "2" will be 20 ml. As the cylinder 116 is moved down, the check valve 122 prevents escape of any of the air being distributed, so that the entire 20 ml. of air will be supplied equally, and in parallel, to each of the compartments of the disposable enclosure.

Figure 10:
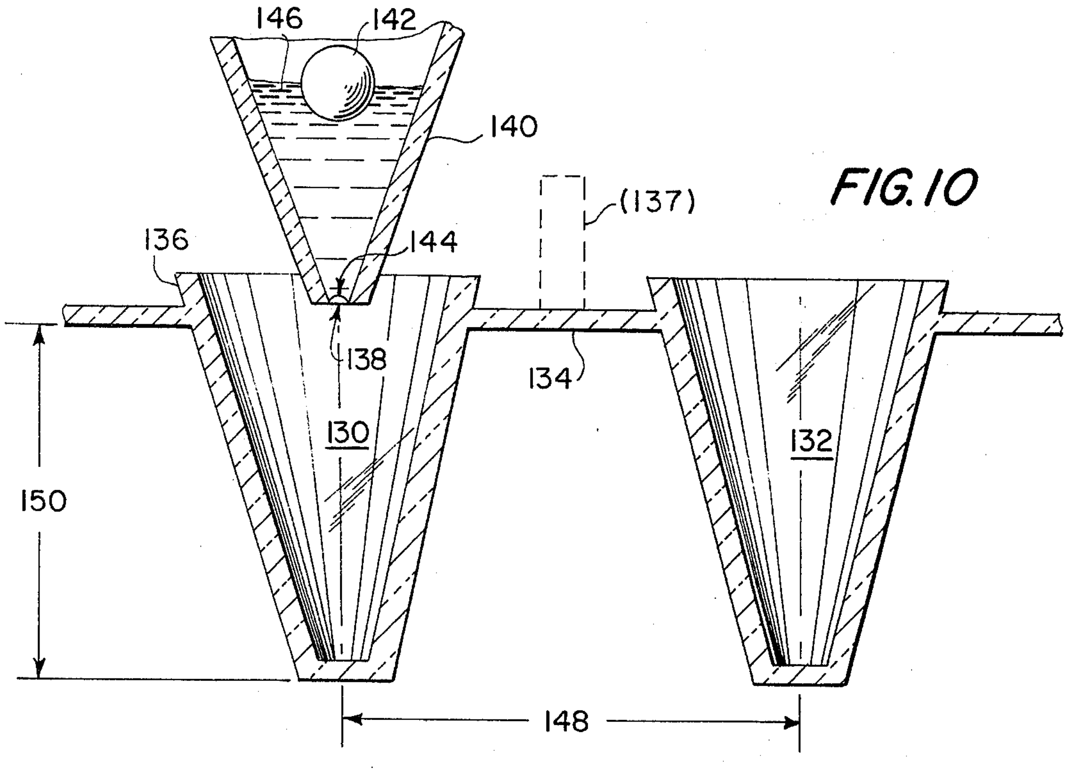
FIG. 10 is a detailed sectional view showing details of one form of secondary containers for use in the present invention, together with a sectional view of a preferred outlet valve construction for a disposable manipulative laboratory device as taught herein.

FIG. 10 illustrates, in further detail, one form of outlet means 140 as extends from the bottom of a second surface on the disposable transfer device. The biological fluid level 146 is shown supporting the buoyant ball 142, and a meniscus 144 is shown formed at the outlet orifice 138. The outlet orifice 138 is chosen so that the hydrostatic pressure of a fluid, such as blood serum, will not overcome a viscous occlusion of the serum at the orifice 138. Hence, no serum will pass through orifice 138 unless a superposed pressure is applied to the upper surface of the liquid level defined by fluid 146. The actual diameter required for orifice 138 to ensure this operation will depend upon the viscosity and specific gravity of the particular biological fluid being transferred. An effective range of diameters would be on the order of 0.01–5.00 mm. for a biological fluid such as blood serum. Also shown in FIG. 10 is a plurality of bridged secondary cups, where a lip 136 is formed extending away from the upper open end of a cup 13. The first cup, 130, is spaced from the second cup, 132, by a dimension 148 which may be chosen to fit the requirements of racks conventionally used to feed automated blood analysis machines, for example. The cups 130 and 132 are separated by a bridge 134 which is substantially coplanar with the opening of an upper end of the cup 130, as shown. Alternatively, a lip member may partially surround the cups. As shown in phantom, a lip 137 is spaced upon bridge 134, between two adjacent cups, 130 and 132. The dimension 150 for a cup 130 may be conveniently chosen to accommodate various subsequent processing machines, so that an entire group of cups may be supplied thereto.

Figure 11:
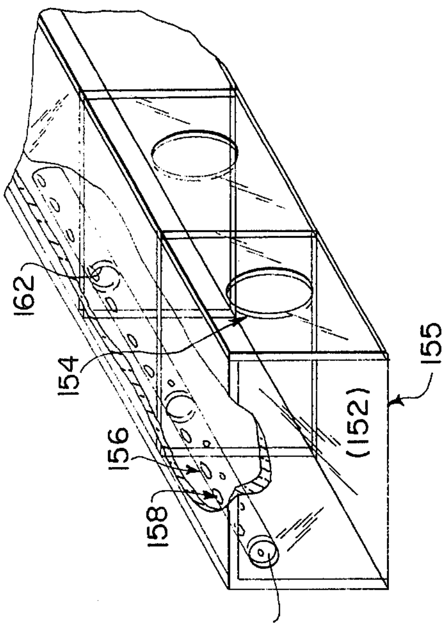
FIG. 11 illustrates details of an alternate embodiment for the gas pressurization channel to each compartment within an enclosure as taught according to the present invention.

FIG. 11 illustrates an alternative structure to supply a gas pressurization equally to a plurality of compartments formed within a disposable enclosure. In the embodiment of FIG. 11 the end wall 152 includes a gas inlet orifice 160, and a tubate header 156 includes individual orifices 158 for uniform pressurization of each compartment. In this embodiment the header 156 may be bonded, or integrally formed, to each septum-like wall dividing the compartments, as shown at 162. The disposable enclosure of FIG. 11 includes a first surface 154 that may also accommodate the open end of a primary container so that a centerline normal to that open end is substantially normal to the first surface. The tubate header of FIG. 11 extends within the disposable enclosure, opposite a first surface 154 and a second surface 155, to cooperate as discussed hereinabove.

Figure 12:
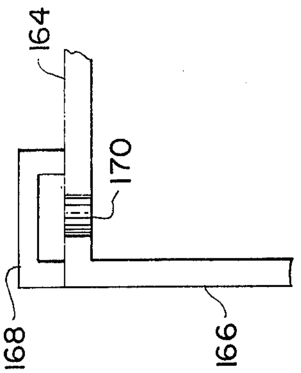
FIG. 12 illustrates yet another embodiment for a gas pressurization channel that is located outside an enclosure according to the teachings of the present invention.

FIG. 12 illustrates a further gas pressurization means construction, wherein a header 168 is positioned outside of an enclosure comprised by a third or front wall 166, and a fourth wall 164. The header 168 communicates in parallel to each compartment as by orifice 170, so that equal volumes of pressurized gas will be supplied to each compartment.

While various embodiments of my invention have been shown and described, it is to be understood that the invention is solely limited by the scope of the appended claims.

I claim:

1. A disposable manipulative laboratory device for transferring biological fluids and reagent mixtures from at least one primary container to an associated secondary container, comprising:

(A) an enclosure defining at least one compartment therein, said enclosure having a first surface with means adapted to receive an open end of at least one primary container for inlet flow communication from a primary container to a compartment, and;

(B) a second surface on said enclosure, said second surface including an outlet means operable for a selective outlet flow communication from said at least one compartment to an associated secondary container when said second surface is positioned substantially horizontal and above an open upper end of a secondary container, and;

(C) means for delivering a selectively controlled volume of pressurized gas to said at least one compartment, whereby said pressurized gas is operable to transfer a selective volume of biological or reagent fluid, that has flowed into a compartment from its associated primary container, into an associated secondary container, wherein said outlet means further includes fluid valve means which is operable to close said outlet flow communication when all biological or reagent fluid within a compartment has been so transferred.

2. A disposable manipulative laboratory transfer device as in claim 1 in combination with at least one primary container that is a blood draw type of collection tube having a volume capacity of between 3 milliliters and 20 milliliters said primary container being in flow communication with said enclosure.

3. A disposable manipulative laboratory transfer device as in claim 1 in combination with at least one primary container that is in flow communication with said enclosure and an associated secondary container which comprises a cup having an upwardly extending lip at least partially surrounding its open upper end, said secondary container being positioned and said lip being configured so as to cooperate with said outlet means when said second surface is positioned above said secondary container.

4. A disposable manipulative laboratory transfer device as in claim 1 in combination with an air pump source of pressurized gas which comprises a piston slideable within an outer cylinder, said outer cylinder having an open proximate end for receiving said piston and a closed distal end which communicates with a pressurization line which supplies pressurized air to said at least one compartment.

5. A disposable manipulative laboratory transfer device as in claim 4 wherein said outer cylinder further includes a check valve proximate its distal end, said check valve being operable to allow ambient air to enter said cylinder and prevent air compressed by said piston within said cylinder from escaping to ambient.

6. A disposable manipulative laboratory transfer device as in claim 1 wherein said receiving means on said first surface is adapted to receive an open end of a primary container through the provision of an inlet orifice that is smaller than, and distensible to accept, the outer diameter of an open end of a blood draw type of collection tube.

7. A disposable manipulative laboratory transfer device as in claim 6 wherein said first surface comprises a semi-rigid form of plastic material having at least one of said inlet orifices defined therein.

8. A disposable manipulative laboratory transfer device as in claim 1 wherein said at least one compartment has an outlet means on said second surface which further comprises a funnel in flow communication with said compartment, said funnel extending outwardly from said second surface and including a fluid orifice at its distal end, said fluid valve means further comprising a ball adapted for buoyant movement within a biological or reagent fluid, said ball being constrained for buoyant movement within said extending funnel.

9. A disposable manipulative laboratory transfer device as in claim 8 wherein said fluid orifice at the distal end of said funnel is dimensioned so that a meniscus of fluid will form at said fluid orifice in the absence of a selective pressurization upon fluid within said compartment by said gas pressurization means.

10. A disposable manipulative laboratory transfer device as in claim 9 wherein said first surface is substantially planar and said receiving means includes at least one inlet through said first surface which is adapted to receive the open end of a primary container so that a centerline normal to the open end of said container is substantially normal to said first surface.

11. A disposable manipulative laboratory transfer device as in claim 10 wherein said second surface is substantially planar and meets said first surface.

12. A disposable manipulative laboratory transfer device as in claim 11 wherein said first and second surfaces meet at substantially a right angle, and said enclosure is further defined by a third surface, substantially parallel and opposite said first surface and a fourth surface, substantially parallel and opposite said second surface.

13. A disposable manipulative laboratory transfer device as in claim 1 wherein said first surface is substantially planar and said receiving means includes at least one inlet through said first surface which is adapted to receive the open end of a primary container so that a centerline normal to the open end of said container is substantially normal to said first surface.

14. A disposable manipulative laboratory transfer device as in claim 13 wherein said second surface is substantially planar and meets said first surface.

15. A disposable manipulative laboratory transfer device as in claim 14 in combination with at least one primary container that is a blood draw type of collection tube having a volume capacity of between 3 milliliters and 20 milliliters said primary container being in flow communication with said enclosure.

16. A disposable manipulative laboratory transfer device as in claim 14 wherein said first and second surfaces meet at substantially a right angle, and said enclosure is further defined by a third surface, substantially parallel and opposite said first surface and a fourth surface, substantially parallel and opposite said second surface.

17. A disposable manipulative laboratory transfer device as in claim 16 in combination with at least one primary container that is a blood draw type of collection tube having a volume capacity of between 3 milliliters and 20 milliliters said primary container being in flow communication with said enclosure.

18. A disposable manipulative laboratory transfer device as in claim 1 in combination with at least one primary container that is in flow communication with said enclosure, a rack to hold said container in a substantially vertical first position so that an open end of said primary container is upwardly disposed, and means to pivot said rack to a substantially horizontal second position and maintain said combination in said second position.

19. A disposable manipulative laboratory transfer device as in claim 18 wherein said enclosure comprises a plurality of compartments and an equal number of primary containers.

20. A disposable manipulative laboratory transfer device as in claim 19 wherein said plurality of primary containers are blood collection type tubes and said first surface includes a plurality of inlet openings distensibly engaging the open upper ends of said primary containers.

21. A disposable manipulative laboratory transfer device as in claim 18 in further combination with a substantially horizontal secondary rack operable for supporting at least one secondary container and positioned for vertical alignment below the outlet means on said enclosure when said primary rack is in said second position.

22. A disposable manipulative laboratory transfer device as in claim 21 wherein said rack further includes means to allow an indexing movement in a horizontal direction with respect to said primary rack.

23. A disposable manipulative laboratory transfer device as in claim 21 wherein said secondary rack further includes a plurality of secondary containers supported thereon and mutually interconnected by bridges.

24. A disposable manipulative laboratory transfer device as in claim 23 wherein the open upper ends of said secondary containers are substantially coplanar with a web of material connecting said secondary containers to define said bridges.

25. A disposable manipulative laboratory transfer device as in claim 1 wherein said enclosure defines a plurality of compartments therein, and each compartment is adapted with means to maintain fluid from an associated primary container separate from adjacent compartments.

26. A disposable manipulative laboratory transfer device as in claim 25 in combination with at least one primary container that is a blood draw type of collection tube having a volume capacity of between 3 milliliters and 20 milliliters said primary container being in flow communication with said enclosure.

27. A disposable manipulative laboratory transfer device as in claim 25 in combination with a plurality of primary and secondary containers in flow communication therewith, wherein each secondary container comprises a cup bridged to an adjacent secondary container by a thin web that is substantially coplanar with the open upper ends of each of said cups, each cup further including an upwardly extending lip proximate its open upper end, said lip being configured so as to cooperate with said outlet means when said second surface is positioned above said secondary containers.

28. A disposable manipulative laboratory transfer device as in claim 25 wherein said plurality of compartments are disposed linearly along said first surface, each compartment being further defined by a septum-like wall structure that is mutually perpendicular to said first and second surfaces.

29. A disposable manipulative laboratory transfer device as in claim 28 wherein said first and second surfaces meet at substantially a right angle.

30. A disposable manipulative laboratory transfer device as in claim 25 wherein an integral rack for supporting a plurality of secondary containers extends outwardly from said second surface, said integral rack including a supporting surface that is spaced outwardly from the distal end of said outlet means and is configured so as to suspend a plurality of secondary containers therefrom.

31. A disposable manipulative laboratory transfer device as in claim 30 wehrein said supporting surface is configured so as to accept a plurality of spaced secondary containers bridged together by a thin web of material that is substantially coplanar with the open upper ends of each of said cups.

32. A disposable manipulative laboratory transfer device as in claim 25 wherein said gas delivery means includes a means to apply a given pressurization equally to each of said plurality of compartments.

33. A disposable manipulative laboratory transfer device as in claim 32 wherein said means for equalizing pressure among compartments comprises a header in gas communication between a source of pressurized gas and each of said plurality of compartments.

34. A disposable manipulative laboratory transfer device as in claim 33 wherein said header is defined by a plurality of gas passages located in septum-like wall structures between each of said compartments, wherein said gas passages are located proximate surfaces of said enclosure opposite said first and second surfaces.

35. A disposable manipulative laboratory transfer device as in claim 33 wherein said header is defined by a tubate gas channel separate from said enclosure, said tubate channel having orifices in separate parallel gas communication to each of said plurality of compartments.

36. A disposable manipulative laboratory transfer device as in claim 35 wherein said tubate channel extends within said enclosure proximate surfaces of said enclosure that are opposite said first and second surfaces.

* * * * *